UNITED STATES PATENT OFFICE.

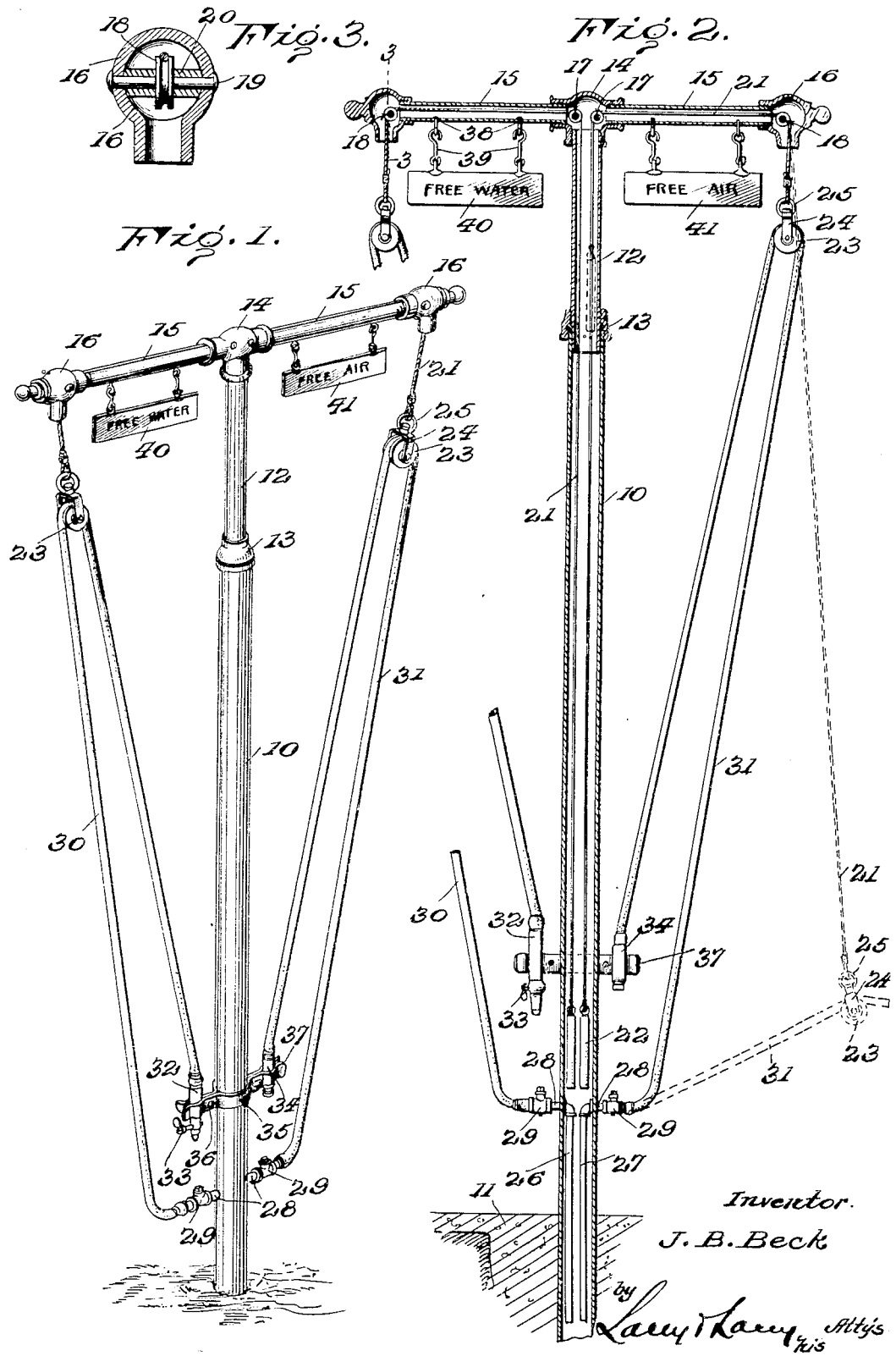

JENNINGS B. BECK, OF COVINGTON, KENTUCKY, ASSIGNOR, BY MESNE ASSIGNMENTS, TO STANDARD OIL COMPANY, A CORPORATION OF INDIANA.

AIR-SERVICE STATION FOR AUTOMOBILES.

1,397,916.          Specification of Letters Patent.       Patented Nov. 22, 1921.

Application filed October 16, 1919. Serial No. 331,229.

*To all whom it may concern:*

Be it known that I, JENNINGS B. BECK, citizen of the United States, residing at Covington, in the county of Kenton and State of Kentucky, have invented certain new and useful Improvements in Air-Service Stations for Automobiles, of which the following is a specification.

This invention relates to an improved air service station for automobiles and other motor vehicles and has as one of its principal objects to provide a device which may be conveniently located at a garage or supply place and at which the tires of an automobile may be conveniently inflated.

The invention has as a further object to provide a device employing an air supply hose and wherein means will be provided for lifting and normally holding the hose elevated so that likelihood of injury to the hose will be reduced to a minimum while, at the same time, the hose will be kept relatively clean and in a position out of the way.

And the invention has as a still further object to provide a device which will be characterized by unusual structural simplicity and which may be readily installed.

Other and incidental objects will appear hereinafter.

In the drawings:

Figure 1 is a perspective view of my improved air station,

Fig. 2 is a vertical sectional view taken centrally through the device, this view being on a somewhat enlarged scale, and Fig. 3 is a transverse sectional view taken on the line 3—3 of Fig. 2.

In carrying the invention into effect, I employ a tubular supporting post 10 which may, if desired, be embedded at its lower end portion in a suitable cement base 11 so that the post may thus be firmly held in an erect position. A pipe 12 is fitted into the upper end portion of the post and is rigidly connected therewith by a collar 13 having threaded engagement with the pipe and with the post. Thus, should it be so desired, the pipe 12 may be readily detached and, as will be clear, this pipe forms a reduced extension projecting vertically from the upper end of the post. Threaded or otherwise secured upon the upper end of the pipe 12 is a T coupling 14, in the lateral branches of which are threaded or otherwise mounted lateral tubular arms 15. Threaded or otherwise mounted upon the outer ends of these arms are elbows 16 which, as suggested in the drawings, may be ornamented or embellished in any approved manner to enhance the attractiveness of the device. Journaled within the T coupling 14 are confronting guide rollers 17 and journaled within the elbows 16 are similar rollers 18. All of these rollers are mounted as shown in detail in Fig. 3 of the drawings, transverse shafts 19 supporting said rollers and carrying spacing sleeves 20 centering the rollers. Trained over the rollers 17 and 18 are cables or other approved flexible elements 21 equipped at their inner ends with weights 22 freely movable vertically within the post 10. Connected to said cables at their outer ends are pulleys 23 having yokes 24 upon which are swiveled rings 25. The end portions of the cables are passed through these rings and then secured in any approved manner.

Upstanding within the lower end portion of the post 10 is a water pipe 26 as well as an air pipe 27. The water pipe is connected with some suitable source of water supply and, in any instance where the present device is located out of doors, this pipe may have a suitable drain cock interposed therein to prevent freezing. The air pipe is connected with some suitable source of air supply. At their ends the pipes 26 and 27 are provided with laterally directed outlets 28 extending freely through the post 10 at opposite sides thereof and interposed in these outlets are shut-off valves 29. Suitably connected to the outlet of the water pipe is a water supply hose 30 and similarly connected to the outlet of the air pipe is an air supply hose 31, the hose 30 and 31 being trained over the pulleys 23. Connected to the outer end of the water supply hose is a discharge nozzle 32 which preferably carries a valve 33 and connected to the outer end of the air supply hose is an appropriate discharge nozzle 34.

As will now be clear in view of the preceding description, the weights 22 will normally serve to lift the supply hose 30 and 31 and hold said hose elevated. Consequently, liability of accidental injury to the hose will thus be reduced to a minimum while, at the same time, the hose will be maintained in a position out of the way.

Further, by this construction, the hose will be kept relatively clean. However, as will be appreciated, the free end of either hose may be grasped when, by pulling thereon, such hose may, as suggested in dotted lines in Fig. 2, be straightened, the corresponding weight 22 being coincidently raised within the post 10. Thus, the water supply hose may be readily manipulated for filling the radiator of an automobile while the air supply hose may be manipulated with equal facility for inflating the tires of an automobile. After using either of the hose 30 or 31 it is simply necessary to release said hose when the weights 22 will respectively act to again elevate the hose to their normal position and in order that the free end portions of the hose may not, when said hose are not in use, swing free, I provide a retaining clamp therefor. As particularly brought out in Fig. 1, this clamp is formed of companion sections 35 formed to fit about the lower end portion of the post 10. Connecting the clamp sections at opposite sides of the post are bolts or other suitable fastening devices 36 from which the outer end portions of the clamp sections are bent to provide pairs of coacting clamp fingers 37. As will be observed, the nozzle 32 may be engaged between one pair of fingers while the nozzle 34 may be engaged between the other pair of fingers. Thus, the free end portions of the hose will be prevented from swinging in the wind while the neat appearance of the device will be materially enhanced.

In connection with the device I preferably employ signs indicating the purpose thereof. Depending from the arms 15 are loops 38 suitably secured to the lower sides of said arms and engaged with these loops are links 39, a pair of such links being arranged upon each arm. Swingingly connected to the lower ends of the links are signs 40 and 41, the sign 40 preferably carrying the words "Free water" while the sign 41 preferably carries the words "Free air." Thus, automobilists may readily observe that either air or water may be obtained free at the device.

Having thus described the invention, what is claimed as new is:

A device of the character described including a tubular post, a lateral hollow arm extending therefrom, a cable extending through the arm and equipped at its inner end with a weight freely movable within the post, a ring carried by the outer end of the cable, a yoke swiveled to said ring, a pulley mounted on said yoke, a supply pipe disposed within the lower portion of the post, a supply hose connected with the pipe outside the post and trained over the pulley whereby the hose will normally be retracted by the weight, and restraining means on the post to be engaged by the free end of the hose.

In testimony whereof I affix my signature.

JENNINGS B. BECK. [L. S.]